Patented Aug. 19, 1941

2,253,457

UNITED STATES PATENT OFFICE 2,253,457

IMPROVING THE DYEING OF TEXTILES

Croyden Meredith Whittaker, Cheadle Hulme, Clifford Collier Wilcock, Salford, and Charles Percival Tattersfield, Audenshaw, near Manchester, England, assignors to Courtaulds Limited, London, England, a British company No Drawing. Application June 6, 1939, Serial No. 277,732. In Great Britain June 13, 1938

6 Claims. (Cl. 8—17)

This invention relates to the treatment of textile materials and is particularly concerned with improvements in and relating to the dyeing of such materials.

It has already been proposed in the specification of British Patent No. 506,793 to obtain good results in respect of dyeing and fastness to washing by incorporating in such materials a product obtained by causing cyanamide and formaldehyde to react under acid or neutral conditions.

The process according to the present invention comprises treating the material with a solution made by dissolving in acid the product which is formed by the interaction of cyanamide and formaldehyde.

The cyanamide and formaldehyde react either directly or in solution. A convenient method of obtaining the reaction product comprises mixing their aqueous solutions preferably in approximately equimolecular proportions and then adjusting the pH value of the solution to a value of 6 or greater, preferably between 6 and 9. The higher the pH value, that is the more alkaline the solution, the more rapidly is the reaction product precipitated. The rate of precipitation can also be accelerated by increasing the temperature, and we have found a temperature of 70° centigrade to be satisfactory although temperatures up to boiling point may be used. The precipitated product which is then separated by filtration, washed and dried, is soluble in acids. Its solubility is affected by its manner of production. For example the more alkaline the solution from which it is precipitated the lower is the solubility of the product in acetic acid. On the other hand a higher reaction temperature tends to give a product more readily soluble in acetic acid. Again if it has been dried at a high temperature such as from 150° to 160° centigrade, boiling with a strong mineral acid, for example sulphuric or hydrochloric acid, may be required to obtain dissolution, but if it has been dried at a lower temperature, as for example at 100° centigrade or below, it may be dissolved on heating with a weak acid such as formic or acetic acid.

Naturally, in view of the deleterious action of mineral acids on some textiles, for example cellulosic materials, it is preferred to use the solutions in the weaker organic acids. As hereinafter explained material treated according to this invention has generally a greater affinity for dyestuffs. This increase in affinity varies according to the method of preparing the solution used for the treatment. Thus, the increase is in ascending order according to whether the compound of cyanamide and formaldehyde is 1. Dissolved in dilute sulphuric acid.
2. Dissolved in dilute formic acid.
3. Dissolved in dilute acetic acid or
4. Dissolved in dilute acetic acid and then the solution neutralised with ammonia.

The treatment may comprise soaking the material in the said solution either hot or cold and may be applied to the material either before or after dyeing. We have found that if the treatment is applied before dyeing, the exhaustion of the dyebath, which is subsequently obtained in the case of the soluble vat dyes known commercially as the Soledon and Indigosal dyes, and of azoic, sulphur, basic and direct cotton dyes, including direct cotton dyes subsequently diazotised and developed, is more complete than when dyeing without the pretreatment; in other words the affinity of the material for these dyes is increased. Moreover, the treatment imparts to the material an affinity for acid dyes, which previously it did not possess. Both the above effects are obtained to different extents with different dyestuffs. If the treatment is applied either before or after dyeing, we ha found that the fastness to cross-dyeing, cold water steeping, perspiration, desizing compour..s and washing is improved.

In addition to the obvious advantage of ec..ic my due to the improved exhaustion of the dyebath, the invention may be utilized by the combination of treated and untreated material in same fabric to obtain double-tone dyeing using a single dyebath. Similarly by applying varying strengths of the acid solution to the fibre and then combining the treated materials in one fabric, multitone dyeing can be obtained.

If, when carrying out the process of the present invention, any tendency for a reduction in the fastness of the dyestuff to light is found, improvements are obtained by adding to the treating solution a small proportion of copper acetate (other than basic copper acetate) or those substances such as copper carbonate and acetic acid which will produce copper acetate in situ. The amount of copper acetate which should be added varies with the dyestuff and the amount of dyestuff on the material, but about 2 per cent calculated on the weight of the material has been found satisfactory.

The materials, to which the process of this invention can be applied include those of silk and casein, and cellulose materials such as cotton, linen and rayon obtainable from viscose or cuprammonium cellulose, or by de-esterifying cellulose esters such as cellulose acetate.

The cyanamide can conveniently be obtained from crude calcium cyanamide by extraction with water and, after filtration, neutralising the resulting solution with sulphuric or hydrochloric acid.

The following examples will further illustrate how the said invention may be carried out in practice, although the invention is not limited to these examples. In all the examples the parts are by weight.

Example 1

12 parts of crude calcium cyanamide are extracted with 60 parts of water at from 35° to 45° centigrade for 30 minutes and then filtered and the solution neutralised with strong sulphuric acid. The calcium sulphate thus precipitated is filtered off and to the filtrate 5 parts of commercial formaldehyde solution containing 40 per cent of formaldehyde are added. The solution is made slightly alkaline with caustic soda and the product which precipitates out is filtered off, washed with water and dried at 100° centigrade.

One part of the product thus obtained is dissolved by boiling in 4 parts of 25 per cent acetic acid solution and made up to a stock solution containing 1 per cent of the product. 100 parts of a piece of fabric made from regenerated cellulose staple fibre are treated with 500 parts of the above stock solution to which have already been added 1,500 parts of water. The treatment is continued for 15 minutes at a temperature of 60° centigrade. The treated fabric is then dyed in a bath containing 2 parts of Indigosol blue I. B. C. (Durand Huegenin & Co.) and 40 parts of sodium chloride dissolved in 4,000 parts of water. The exhaustion of the dyebath obtained is substantially greater than when dyeing untreated material under otherwise identical conditions.

Example 2

100 parts of a piece of fabric made from regenerated cellulose staple fibre and dyed with the dyestuff marketed under the name "Solar Rubinole B" (Sandoz Chemical Works) are treated with a solution obtained by diluting 200 parts of the stock solution described in Example 1, with 1,800 parts of water. The treatment is continued for 20 minutes at 40° centigrade, and after washing and drying, the dye in the treated material is considerably faster to wet processing than that in the untreated material.

Example 3

Calcium cyanamide is vigorously agitated with six times its weight of water at 50° centigrade for 30 minutes. The slurry obtained is filtered and the filtrate rapidly cooled to below 20° centigrade. The residue on the filter is washed with the minimum of water—not more than say 5 per cent of the total volume of filtrate. Hydrochloric acid is added to the filtrate until the solution is only faintly alkaline and the temperature is then rapidly raised to 70° centigrade. The cyanamide content of the solution having been determined by analysis, slightly more than the molecular equivalent of formaldehyde is now added in the form of a 40 per cent solution. The resulting solution is maintained faintly alkaline by the addition of caustic soda solution and at about 70° centigrade, whereupon an insoluble product is precipitated. After standing for 2 hours the precipitate is filtered off, washed with water and dried at 70° centigrade. 3 parts of the product so obtained are dissolved by boiling in 12 parts of 25 per cent acetic acid solution and the solution diluted with water to 2,000 parts. A fabric made from regenerated cellulose staple fibre sold under the registered trade-mark "Fibro" is dyed with "Chlorazul Fast Black BKS" (Imperial Chemical Industries Limited), and is then treated with the above solution for 20 minutes at 40° centigrade, the liquor to fabric ratio being 20 to 1. After washing and drying it is found that the dye in the treated material is considerably faster to wet processing than that in the untreated material.

Example 4

A piece of fabric made from regenerated cellulose staple fibre is dyed in a dyebath containing 1.5 per cent on the weight of the fabric of the dyestuff marketed under the name "Viscose Blue Grey NB" (Kuhlmann, France). The resulting dyed material is treated for 20 minutes at room temperature in a dilute acetic acid bath containing 3 per cent calculated on the weight of the fabric of the product precipitated from an alkaline cyanamide formaldehyde solution as described in Example 1, and in addition 2 per cent calculated on the weight of the material of normal copper acetate. The liquor to fabric ratio of the after-treating bath is 40 to 1. The fabric thus treated shows greater fastness to light than similarly dyed material treated with an acid solution of the product not containing copper acetate.

What we claim is:

1. A process for improving the dyeing properties of textile materials which comprises treating the material with a solution obtained by dissolving in acid the condensation product which is produced by the interaction of an alkaline solution of cyanamide and formaldehyde at a temperature within the range of 70° C. to 100° C.

2. Process for improving the dyeing properties of textile materials which comprises treating the material with a solution obtained by dissolving in acetic acid the condensation product which is produced by the interaction of cyanamide and formaldehyde in an aqueous solution having a pH value ranging between six and nine at a temperature ranging between 70° C. and 100° C.

3. Process for improving the dyeing properties of textile materials which comprises treating the material with a hydrochloric acid solution of the condensation product which is produced by the interaction of equimolecular proportions in alkaline solution and at a temperature within the range of 70° C. to 100° C. of cyanamide and formaldehyde.

4. Process for improving the dyeing properties of textile materials which comprises mixing aqueous solutions of cyanamide and formaldehyde in approximately equimolecular proportions, then adjusting the pH value of the mixture to a value between 6 and 9 and the temperature to between 70° C. and 100° centigrade thereby precipitating the reaction product, separating the precipitated condensation product from the liquid, drying said condensation product at a temperature lower than the reaction temperature dissolving the condensation product in a weaker organic acid at a boiling temperature thereby forming a treating solution, and treating the textile material with said treating solution at a lower temperature.

5. Textile materials the dyeing properties of which have been improved according to the process claimed in claim 1.

6. Process for improving the dyeing properties of textile materials which comprises treating the material after dyeing with a solution obtained by dissolving in acid the condensation product which is produced by the interaction of an alkaline solution of cyanamide and formaldehyde at a temperature between 70° C. and 100° C. and adding a small proportion of copper acetate to the treating solution.

CROYDEN MEREDITH WHITTAKER.
CLIFFORD COLLIER WILCOCK,
CHARLES PERCIVAL TATTERSFIELD.